United States Patent [19]

Wetherell

[11] 4,066,912

[45] Jan. 3, 1978

[54] COUPLING ARRANGEMENT FOR POWER LINE CARRIER SYSTEMS

[75] Inventor: Daniel L. Wetherell, Lynchburg, Va.

[73] Assignee: General Electric Company, Lynchburg, Va.

[21] Appl. No.: 678,962

[22] Filed: Apr. 21, 1976

[51] Int. Cl.² .......................................... H04M 11/00
[52] U.S. Cl. .................................. 307/3; 340/310 R
[58] Field of Search ................ 307/3, 1, 2; 340/310 R

[56] References Cited

U.S. PATENT DOCUMENTS 3,846,638  11/1974  Wetherell ................................ 307/3

OTHER PUBLICATIONS

Sutton; Howard J., *Power Line Carrier Tests on a 500 KV Line;* Apr. 16, 1973: Conference Paper.

*Primary Examiner*—Herman Hohauser
*Attorney, Agent, or Firm*—James J. Williams

[57] ABSTRACT

First and second bands of separate frequencies are coupled through hybrid transformers and frequency isolation filters to each of three phase wires of a power transmission line. The hybrid transformers and filters are arranged so that both bands of frequencies are transmitted and received even though there is an open or short circuit on one of the feed lines or one of the phase wires, thus providing the reliability desired or needed, particularly when the frequency bands provide relaying functions.

8 Claims, 2 Drawing Figures

COUPLING ARRANGEMENT FOR POWER LINE CARRIER SYSTEMS

BACKGROUND OF THE INVENTION

My invention relates to a coupling arrangement for power line carrier systems, and particularly to such a coupling arrangement that provides redundancy and greater reliability.

Carrier systems designed to operate over power transmission lines should be extremely reliable. Where such carrier systems provide switching or relaying functions, the highest degree of reliability is required because of the large number of customers served by such power lines. Consequently, such power lines should be kept in service if no fault exists. However, because of the great value and cost of power equipment and lines, the power lines should be removed from service if a fault does occur.

Accordingly, a primary object of my invention is to provide a new and more reliable arrangement for coupling carrier systems to a power line.

Another object of my invention is to provide a new and improved arrangement that uses redundant paths to couple different carrier systems to power lines, and that provides good isolation between the carrier systems.

Another object of my invention is to provide a new and improved redundant arrangement for coupling carrier systems to power lines with relatively small coupling loss.

A relatively specific object of my invention is to provide a new arrangement for coupling each of two carrier systems to each of three phase wires of a power transmission line to provide reliable operation of the carrier systems.

Redundant arrangements for coupling carrier systems to power lines have been provided before. For example, an arrangement for coupling two carrier systems to each of two phase wires is taught in a conference paper by H. J. Sutton entitled "Power Line Carrier Tests on a 500 KV Line", and presented at a Texas A&M Relay Conference on Apr. 16, 1973. However, that arrangement couples the carrier systems to only two phase wires of a power transmission line, and hence was subject to relatively large transmission line losses. Also four relatively costly coupling capacitors are required instead of three.

Accordingly, another object of my invention is to provide a new and improved arrangement for coupling two carrier systems to each of three phase wires of a power transmission line so as to obtain relatively efficient transmission and low loss over the phase wires.

SUMMARY OF THE INVENTION

Briefly, these and other objects are achieved in accordance with my invention by a coupling arrangement using hybrid transformers for branching the carrier systems and frequency filters for isolating the carrier systems from each other. Each of the carrier systems is coupled to each of the three phase wires of a power transmission line so as to provide redundant and hence reliable coupling, so as to have relatively low loss as a result of the branching, and so as to transmit carrier signals over the three phase wires as efficiently and with as little loss as possible.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF PREFERRED EMBODIMENTS

Figure 1:
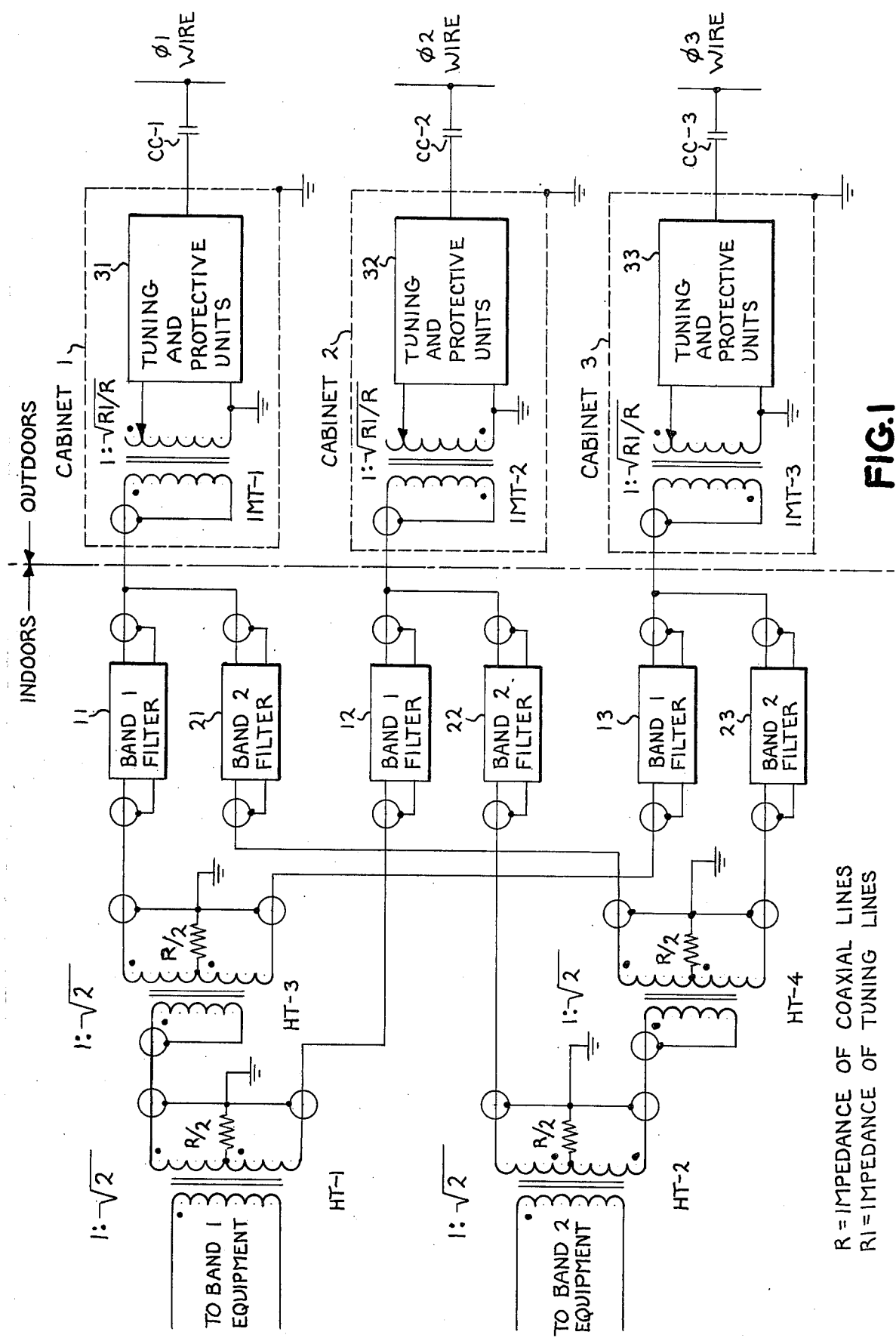
FIG. 1 shows a circuit diagram of one coupling arrangement in accordance with my invention.

In power line carrier systems, typical carrier frequencies are 30 kilohertz and higher, whereas the power frequencies are around 60 hertz. This difference in frequencies permits the power frequencies and the carrier frequencies to be isolated from each other by appropriate coupling elements, as is well known in the art. Where the carrier frequencies are used to transmit relaying and similar functions, reliability is extremely important, and the power transmission companies are willing to go to almost any length to obtain such extreme reliability. For this reason, relaying functions are often duplicated or made redundant. In FIG. 1, I have assumed that two-way carrier equipment is supplied for each of two carrier frequency bands 1 and 2 to provide duplicate relaying functions on a power transmission line having three phase wires. It is desirable that the separation of the two bands be sufficiently far so that practical filtering may be provided, as will be explained. Thus, band 1 may occupy frequencies between 60 and 84 kilohertz for example, and band 2 may occupy frequencies between 96 and 120 kilohertz for example.

The band 1 carrier equipment is coupled to the primary winding of a hybrid transformer HT-1, and the band 2 carrier equipment is coupled to the primary winding of a hybrid transformer HT-2. These and other hybrid transformers are wound so that corresponding instantaneous winding voltages are indicated by the polarity dots at respective ends of the windings, and so that the primary to secondary impedance ratio is $1:\sqrt{2}$. The secondary windings of the hybrid transformers are provided with a center tap which is connected through a resistor to a point of reference potential or ground. This resistor has an impedance that is half the impedance of the lines, preferably coaxial, interconnecting the transformers. These coaxial lines are shown with their inner conductors indicated by a straight line, and by their outer conductors indicated by a circle which does not extend for the length of the inner conductor in the drawing, but which, in actuality, does extend along and around the length of the inner conductor. One end of the secondary winding of the transformer HT-1 is connected to the primary winding of a hybrid transformer HT-3. In a similar manner, one end of the secondary winding of the hybrid transformer HT-2 is connected to the primary winding of a hybrid transformer HT-4. The other end of the secondary winding of the transformer HT-1 is connected to a band 1 filter 12, and the other end of the secondary winding of the transformer HT-2 is connected to a band 2 filter 22. The ends of the secondary winding of the transformer HT-3 are connected to respective band 1 filters 11, 13, and the ends of the secondary winding of the transformer HT-4 are connected to respective band 2 filters 21, 23. All of the band 1 filters 11, 12, 13 are tuned or arranged to pass frequencies of band 1 and reject frequencies of band 2; and all of the band 2 filters 21, 22, 23 are arranged to pass only frequencies of band 2 and reject frequencies of band 1.

The circuit of FIG. 1 as described thus far is typically located in a building or suitable housing to protect it from the outdoor weather. The band 1 and band 2 filters 11, 21 pass signals comprising bands 1 and 2, and these signals are applied through a coaxial line (which is preferably buried or placed in a concrete or other suitable cable trough in the switchyard) that leads to an outdoor cabinet 1 comprising an impedance matching transformer IMT-1 and tuning and protective units 31. The impedance matching transformer IMT-1 is provided with windings which match the impedance R of the coaxial line connected to the filters 11, 21 and the impedance R1 of the tuning and protective unit 31. This and other impedance matching transformers have their primary and secondary windings arranged as indicated by the polarity dots. This unit 31 and other tuning and protective units are provided to tune the equipment and to protect it from high voltage surges and overloads. Such units are known in the art. Their output is connected through a coupling capacitor CC-1 to the actual transmission line, in this case the phase 1 wire.

The band 1 and band 2 filters 12, 22 are connected through a similar arrangement by another coaxial cable to an outdoor cabinet 2 containing similar equipment. The output of this cabinet 2 is connected through a coupling capacitor CC-2 to a phase 2 wire. And finally, the band 1 and band 2 filters 13, 23 are coupled by another coaxial line to an outdoor cabinet 3, and this in turn is coupled through a coupling capacitor CC-3 to a phase 3 wire.

With band 1 and band 2 frequencies applied to the respective hybrid transformers HT-1, HT-2, these signals are respectively split. Half of the signals from the transformer HT-1 are applied to the transformer HT-3. These signals are also split, with half going to the phase 1 wire and the other half going to the phase 3 wire. In a similar fashion, the band 2 signals are split by the transformers HT-2, HT-4 so that they also go to the phase 1 and phase 3 wires. The phase 1 and phase 3 signals have the same respective phase, and may be represented or thought of as a composite signal comprised of two signal voltages V1 and V2. The other half of the signals from the transformers HT-1, HT-2 are filtered and applied to the phase 2 wire. These signals may be considered to have a magnitude that is 1.4 V1 and 1.4 V2 respectively, and that are 180° out of phase with the signals V1 and V2 on phases 1 and 3. Thus, a mode 3 type of transmission, with its inherently low loss, is provided. As known in the art, this mode 3 uses two phase wires for transmission at 0°, and the third phase wire for transmission at 180°. Such an arrangement not only provides the lowest transmission loss, but also insures that if one or two of the phase wires is opened or short-circuited, transmission will still continue with respect to ground over the remaining phase wire or wires. In addition, the redundant operation of both frequency bands over both coaxial lines connecting the filters 11, 12, 13, 21, 22, 23 to the outdoor cabinets is also provided, so that if any part of these lines is opened or short-circuited, transmission will still continue, but at a lower level, over the remaining lines. Thus redundant operation that is free or relatively free of short-circuit or open circuit conditions of the electronic equipment (namely the transformers, coaxial lines, and filters) is provided.

Figure 2:
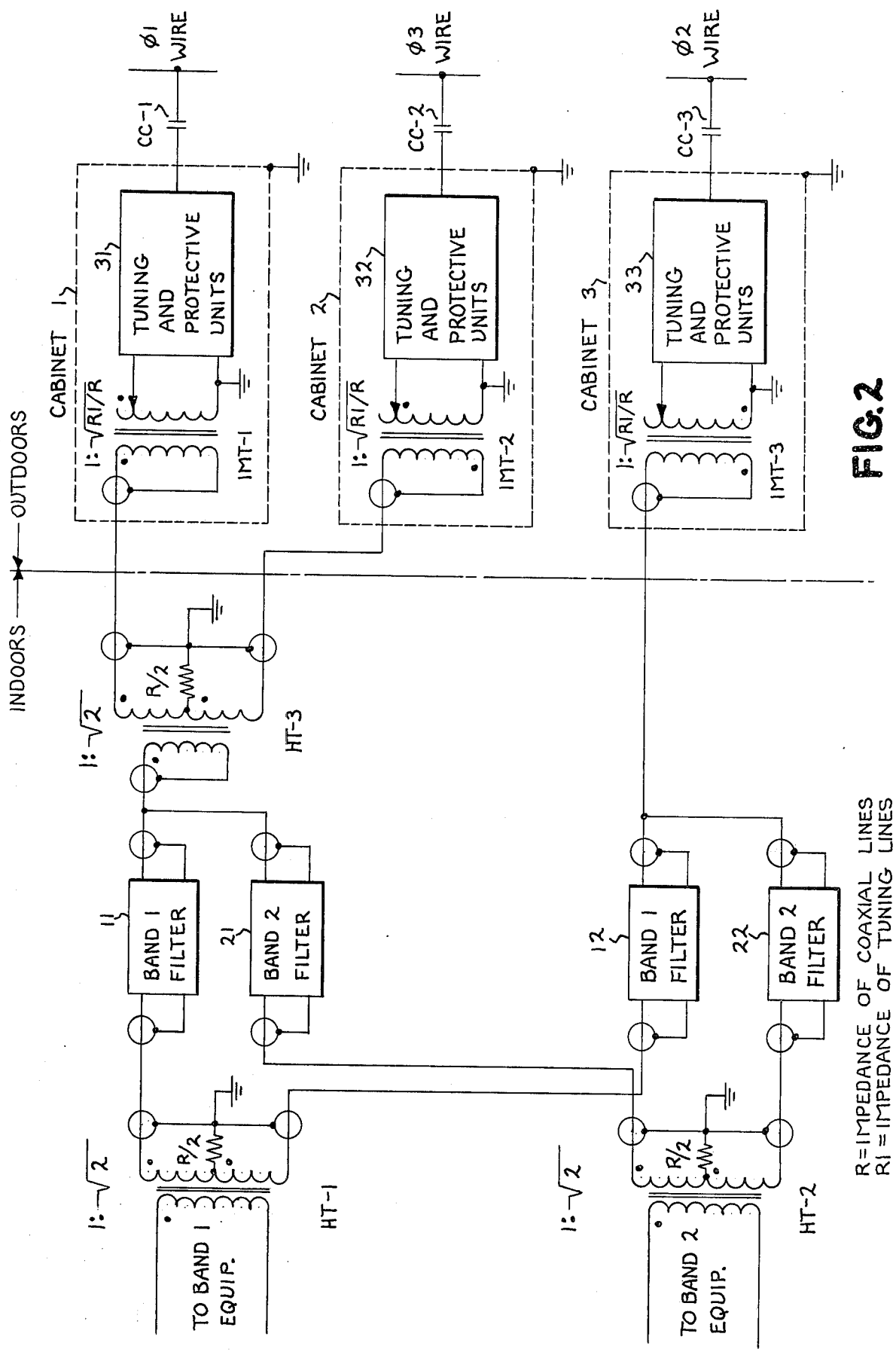
FIG. 2 shows a circuit diagram of a second coupling arrangement in accordance with my invention.

FIG. 2 shows a circuit diagram of another embodiment in accordance with my invention. In FIG. 2, parts corresponding to those in FIG. 1 have been given the same reference numerals. The circuit of FIG. 2 requires only three hybrid transformers and four filters. The hybrid transformer HT-1 for the band 1 equipment has its secondary windings connected to band 1 filters 11, 12; and the secondary winding of the hybrid transformer HT-2 is connected to band 2 filters 21, 22. As before, the band 1 filters 11, 12 are arranged to pass only band 1 or to reject band 2, or a combination of passing and rejecting; and the band 2 filters 21, 22 are arranged to pass only band 2, or to reject band 1, or a combination. The outputs from the band 1 and band 2 filters 11, 21 are combined and applied to a hybrid transformer HT-3 for splitting between phase 1 and phase 3 wires through cabinets 1 and 2 as described in connection with FIG. 1. The outputs from the band 1 and band 2 filters 12, 22 are combined and applied directly to cabinet 3. Thus, there is nearly the same level of redundancy as provided in FIG. 1, but two of the coaxial lines between the indoors and outdoor equipment are derived from the hybrid transformer HT-3, and the other coaxial line is connected to the filters 12, 22. The difference in redundancy results from the fact that if the input connection to the hybrid transformer HT-3 of FIG. 2 fails, then both band 1 and band 2 will not be applied to phase 1 and phase 3 wires. If the input connection to the hybrid transformer HT-3 of FIG. 1 fails, then band 1 will not be applied to phase 1 and phase 3 wires. Thus, band 1 and band 2 signals are applied at voltages V1 and V2 and a reference phase to the phase 1 and phase 3 wires; and signals representing bands 1 and 2 are applied to the phase 2 wire at voltages 1.4 V1 and 1.4 V2 and at 180° phase with respect to the signals on phase wires 1 and 3. Thus, nearly the same reliability of connections to the phase wires is provided, and the same desirable mode 3 type of coupling over the transmission line is also provided.

With respect to both FIGS. 1 and 2, similar arrangements would be provided at distant ends of the phase wires for receiving signals from the near end and for transmitting signals to the near end.

It will thus be seen that I have provided a new and improved coupling arrangement which utilizes redundant connections for reliability. These connections also represent an improvement in that they are relatively free of open and short circuit conditions, since such open or short circuit conditions on one of the coaxial lines or phase wires does not destroy transmission over the other coaxial lines and phase wires. It will, however, reduce the signal level of transmission. However, where reliability is as essential as in relaying functions for power lines, any signal is better than none at all. While I have shown only two embodiments of my invention, it is to be understood that modifications may be made without departing from the spirit of the invention or from the scope of the claims.

What I claim as new and desire to secure by Letters Patent of the United States is:

1. An improved arrangement for coupling first and second separated frequency bands to each of first, second, and third phase wires of a power transmission line comprising:

a. a first hybrid transformer having an input for said first frequency band and first and second outputs coupled thereto;
b. a second hybrid transformer having an input for said second frequency band and first and second outputs coupled thereto;
c. a third hybrid transformer having an input coupled to said first output of said first hybrid transformer and having first and second outputs coupled thereto;
d. a fourth hybrid transformer having an input coupled to said second output of said second hybrid transformer and having first and second outputs coupled thereto;
e. first, second, and third filters for said first frequency band;
f. fourth, fifth, and sixth filters for said second frequency band;
g. means connecting said first filter between said first output of said third hybrid transformer and said first phase wire;
h. means connecting said second filter between said second output of said first hybrid transformer and said second phase wire;
i. means connecting said third filter between said second output of said third hybrid transformer and said third phase wire;
j. means connecting said fourth filter between said first output of said fourth hybrid transformer and said first phase wire;
k. means connecting said fifth filter between said first output of said second hybrid transformer and said second phase wire;
l. and means connecting said sixth filter between said second output of said fourth hybrid transformer and said third phase wire.

2. The improved arrangement of claim 1 wherein said first, second, and third filters pass substantially only said first frequency band, and wherein said fourth, fifth, and sixth filters pass substantially only said second frequency band.

3. The improved arrangement of claim 1 wherein said first, second, and third filters reject said second frequency band, and wherein said fourth, fifth, and sixth filters reject said first frequency band.

4. The improved arrangement of claim 1 wherein each of said hybrid transformers comprises a secondary winding having a center tap with an impedance matching resistor connected thereto.

5. An improved arrangement for coupling first and second separated frequency bands to each of first, second, and third phase wires of a power transmission line comprising:
a. a first hybrid transformer having an input for said first frequency band and first and second outputs coupled thereto;
b. a second hybrid transformer having an input for said second frequency band and first and second outputs coupled thereto;
c. a third hybrid transformer having an input and having first and second outputs coupled thereto;
d. first and second filters for said first frequency band;
e. third and fourth filters for said second frequency band;
f. means connecting said first filter between said first output of said first hybrid transformer and said input of said third hybrid transformer;
g. means connecting said third filter between said first output of said second hybrid transformer and said input of said third hybrid transformer;
h. means connecting said first output of said third hybrid transformer to said third phase wire;
i. means connecting said second output of said third hybrid transformer to said third phase wire;
j. means connecting said second filter between said second output of said first hybrid transformer and said second phase wire;
k. and means connecting said fourth filter between said second output of said second hybrid transformer and said second phase wire.

6. The improved arrangement of claim 5 wherein said first and second filters pass substantially only said first frequency band, and wherein said third and fourth filters pass substantially only said second frequency band.

7. The improved arrangement of claim 5 wherein said first and second filters reject said second frequency band, and wherein said third and fourth filters reject said first frequency band.

8. The improved arrangement of claim 5 wherein said hybrid transformers comprise a secondary winding having a center tap with a resistor connected thereto.

* * * * *